United States Patent
Ryu et al.

(10) Patent No.: US 9,710,872 B2
(45) Date of Patent: Jul. 18, 2017

(54) INFORMATION INSERTION METHOD, INFORMATION EXTRACTION METHOD, AND INFORMATION EXTRACTION APPARATUS USING DOT-BASED INFORMATION ROBUST TO GEOMETRIC DISTORTION

(71) Applicant: ELECTRONICS AND TELECOMMUNICATIONS RESEARCH INSTITUTE, Daejeon (KR)

(72) Inventors: Seung Jin Ryu, Daejeon (KR); Min Sik Kim, Daejeon (KR); Han Jun Yoon, Daejeon (KR); Do Hoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/729,228

(22) Filed: Jun. 3, 2015

(65) Prior Publication Data
US 2016/0217546 A1 Jul. 28, 2016

(30) Foreign Application Priority Data
Jan. 28, 2015 (KR) .................. 10-2015-0013371

(51) Int. Cl.
*G06K 9/00* (2006.01)
*G06T 1/00* (2006.01)
(Continued)

(52) U.S. Cl.
CPC ......... *G06T 1/0064* (2013.01); *H04N 1/0087* (2013.01); *H04N 1/32203* (2013.01); *G06T 2201/0051* (2013.01)

(58) Field of Classification Search
CPC ... G06T 1/0021; G06T 1/0028; G06T 1/0035; G06T 1/0042; G06T 1/005; G06T 1/0057; G06T 1/0064; G06T 1/0071
See application file for complete search history.

(56) References Cited

U.S. PATENT DOCUMENTS 5,453,605 A * 9/1995 Hecht .............. G06K 19/06037
235/456
5,949,055 A * 9/1999 Fleet .................... G06T 1/0028
235/454

(Continued)

FOREIGN PATENT DOCUMENTS

EP 1 833 001 A1 9/2007
KR 10-0403204 B1 10/2003
(Continued)

OTHER PUBLICATIONS

Briffa et al ("Imperceptible Printer Dot Watermarking for Binary Documents", 2010).*

(Continued)

*Primary Examiner* — Avinash Yentrapati
(74) *Attorney, Agent, or Firm* — LRK Patent Law Firm

(57) ABSTRACT

An information insertion method, an information extraction method, and an information extraction apparatus using dot-based information are provided herein. The information extraction apparatus includes an identification unit and an extraction unit. The identification unit identifies a set of at least one dot output to a target. The extraction unit extracts information from the set of at least one dot.

10 Claims, 23 Drawing Sheets

(51) Int. Cl.
*H04N 1/00* (2006.01)
*H04N 1/32* (2006.01)

(56) References Cited

U.S. PATENT DOCUMENTS

| | | | | |
|---|---|---|---|---|
| 6,606,421 B1 * | 8/2003 | Shaked | .................... | G06K 5/00 382/275 |
| 6,959,098 B1 * | 10/2005 | Alattar | ............... | H04N 1/32144 382/100 |
| 7,072,487 B2 * | 7/2006 | Reed | .................... | G06T 1/0028 382/100 |
| 7,289,643 B2 * | 10/2007 | Brunk | ............... | G06K 9/00744 382/100 |
| 8,913,299 B2 * | 12/2014 | Picard | .................. | G03G 21/046 283/902 |
| 2009/0059299 A1 * | 3/2009 | Yoshida | ................ | G06F 3/0317 358/1.18 |
| 2011/0007092 A1 * | 1/2011 | Ihara | .................. | H04N 1/32203 345/629 |
| 2011/0011940 A1 * | 1/2011 | Yoshida | ................. | G06K 19/06 235/494 |
| 2013/0249933 A1 * | 9/2013 | Yoshida | ........... | G06K 19/06037 345/590 |
| 2016/0283811 A1 * | 9/2016 | Yoshida | ................... | G06K 9/18 |

FOREIGN PATENT DOCUMENTS

| | | |
|---|---|---|
| KR | 10-0906457 B1 | 7/2009 |
| KR | 10-2009-0132835 A | 12/2009 |
| KR | 10-1163511 B1 | 7/2012 |
| KR | 10-2014-0104789 A | 8/2014 |
| WO | 02/31752 A1 | 4/2002 |

OTHER PUBLICATIONS

J. A. Briffa et al., "Imperceptible Printer Dot Watermarking for Binary Documents," Proc. of SPIE7723, Optics, Photonics, and Digital Technologies for Multimedia Applications, 2010.

* cited by examiner

| VALUE OF BIT STRING | 0 | 1 |
|---|---|---|
| DOT PATTERN | | |

FIG. 7

| VALUE OF BIT STRING | 00 | 01 | 10 | 11 |
|---|---|---|---|---|
| DOT PATTERN | | | | |

FIG. 8

| VALUE OF BIT STRING | 0 | 1 |
|---|---|---|
| DOT PATTERN |  |  |

INFORMATION INSERTION METHOD, INFORMATION EXTRACTION METHOD, AND INFORMATION EXTRACTION APPARATUS USING DOT-BASED INFORMATION ROBUST TO GEOMETRIC DISTORTION

CROSS-REFERENCE TO RELATED APPLICATION

This application claims the benefit of Korean Patent Application No. 10-2015-0013371, filed Jan. 28, 2015, which is hereby incorporated by reference herein in its entirety.

BACKGROUND

1. Technical Field

Embodiments of the present invention relate generally to image processing and, more particularly, to an information insertion method, an information extraction method, and an information extraction apparatus using dot-based information robust to geometric distortion.

2. Description of the Related Art

As the technical capabilities of companies improve, cases where high-tech industrial technologies are externally leaked continue to occur. The leakage of technology is chiefly performed by insiders who intelligently make bad use of the weak points of existing security systems.

Accordingly, there is a need for a technology that is capable of inserting barely perceptible or imperceptible information into a target, such as a printed confidential document or a monitor screen, and extracting the inserted information from the target when the target is externally divulged.

In relation to the insertion of information into a target, there is a method of inserting information into a target by controlling the location and direction of a dot pattern inserted into the target. A related technology using this method includes Korean Patent No. 10-0906457 entitled "Information Input/Output Method Using Dot Pattern." In this technology, reference lattice lines are present on the surface of a medium in a vertical direction and a horizontal direction. A dot is disposed at a location that corresponds to a specific distance and direction for a virtual lattice dot, that is, the intersection of the reference lattice lines, and information is inserted into the location. In other words, the distance and direction of a dot for a virtual lattice dot represents information. However, this technology is problematic in that it requires a reference lattice dot for indicating a reference lattice line and it is not robust to various geometric modifications.

Another related technology regarding the insertion of information into a target includes Korean Patent No. 10-0403204 entitled "Method and Apparatus for Embedding and Extracting Watermark for Binary Text." In this technology, a document is converted into a binary image, a line in which letters are written is detected in the binary image, and information is inserted by deforming information in the detected line. However, this method is problematic in that it is difficult to deform information in a line in an actual environment in which information is inserted and extracted and that the method is not robust to various geometric modifications.

As described above, the above related technologies have limitations on actually inserting meaningful information into a target and extracting meaningful information from a target.

SUMMARY

At least some embodiments of the present invention are directed to the provision of a method, apparatus, and system for inserting information into a target and extracting information from the target.

At least some embodiments of the present invention are intended to provide a method, apparatus, and system using a barely perceptible form or an imperceptible form in the insertion of information and the extraction of information.

At least some embodiments of the present invention are intended to provide a method, apparatus, and system for performing correction on geometric distortion that has been applied to an image of a target in the extraction of information.

According to an aspect of the present invention, there is provided an information insertion method, including: receiving information; converting the information into a set of at least one dot; and outputting the set of at least one dot to a target.

Outputting the set of at least one dot may include converting the data of the target so that the set of at least one dot can be inserted into the target.

Outputting the set of at least one dot may include adding a substance, indicative of the set of at least one dot, to the target.

The substance may be perceptible under a predetermined type of light.

Converting the information may include: splitting the information into at least one bit string of a predetermined length; for each bit string of the at least one bit string, adding a dot pattern that corresponds to the each bit string among a plurality of different dot patterns as a dot of the set of at least one dot; and setting the location of each dot of the set of at least one dot.

The at least one dot may be disposed at irregular intervals.

Outputting the set of at least one dot may include: identifying a region of the target to which the set of at least one dot is to be output; converting the set of at least one dot into a barely perceptible form or an imperceptible form in terms of at least one of color and texture of the region; and outputting the converted set of at least one dot to the region.

According to another aspect of the present invention, there is provided an information extraction method, including: identifying a set of at least one dot output to a target; and extracting information from the set of at least one dot.

Identifying the set of at least one dot may include detecting the set of at least one dot within the target by analyzing data of the target.

Identifying the set of at least one dot may include: capturing an image of the target; and detecting the set of at least one dot in the captured image.

The information extraction method may further include emitting a predetermined type of light, which makes a substance, output to the target, perceptible, to the target.

The information extraction method may further include performing correction on geometric distortion applied to the set of at least one dot.

Performing correction on the geometric distortion may include performing correction on projection and rotation distortion applied to the set of at least one dot; and performing correction on the projection and rotation distortion may include detecting four reference dots in a region of the set of at least one dot and performing correction on the projection and rotation distortion using the four reference dots.

Performing correction on the projection and rotation distortion may include generating a set of a horizontal line and a set of a vertical line passing through the at least one dot, extracting two horizontal lines from the set of a horizontal line, and extracting two vertical lines from the set of a vertical line; the four reference dots may be the intersections of the two horizontal lines and the two vertical lines; the two horizontal lines may include a horizontal line closest to an origin and a horizontal line farthest from the origin; and the two vertical lines may include a vertical line closest to the origin and a vertical line farthest from the origin.

Performing correction on the projection and rotation distortion may include performing Hough transform on at least one central coordinate of the at least one dot; and horizontal lines and vertical lines passing through the at least one dot may be horizontal lines and a vertical lines passing through the at least one central coordinate to which the Hough transform has been applied.

Generating the set of horizontal lines and the set of vertical lines may include: detecting at least one rectilinear line passing through the at least one dot; detecting two angle ranges in which the rectilinear lines are maximally present; and including the rectilinear lines, which corresponds to one of the two angle ranges, in the set of horizontal lines or the set of vertical lines.

The information extraction method may further include performing correction on size distortion applied to the set of at least one dot; and performing the correction on the size distortion may include: generating a cumulative value in a horizontal and a cumulative value in a vertical direction by accumulating values of the central coordinates of the at least one dot in the horizontal direction and the vertical direction; detecting a horizontal period and a vertical period, in which, the at least one dot appears, by analyzing the cumulative value in the horizontal direction and the cumulative value in the vertical direction; and correcting an image of the set of at least one dot so that the horizontal period and the vertical period match an original period.

The horizontal period and the vertical period may be detected by frequency domain analysis of the cumulative value in the horizontal direction and the cumulative value in the vertical direction.

Extracting the information may include: for each dot of the set of at least one dot, determining a dot pattern that corresponds to the each dot among a plurality of different dot patterns; and using the value of a bit string of the determined dot pattern as at least part of the information.

According to still another aspect of the present invention, there is provided an information extraction apparatus, including: an identification unit configured to identify a set of at least one dot output to a target; and an extraction unit configured to extract information from the set of at least one dot.

BRIEF DESCRIPTION OF THE DRAWINGS

The above and other targets, features and advantages of the present invention will be more clearly understood from the following detailed description taken in conjunction with the accompanying drawings, in which:

FIG. 7 is a diagram illustrating a dot pattern having no form according to an example;

FIG. 8 is a diagram illustrating a plurality of dot patterns of a bit string having a length of 2 according to an example;

DETAILED DESCRIPTION

Figure 1:
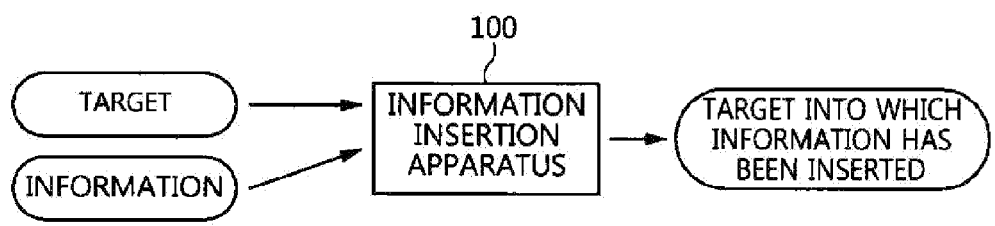
FIG. 1 is a diagram illustrating the operation of an information insertion apparatus according to an embodiment of the present invention.

Embodiments of the present invention will be described in detail below with reference to the accompanying drawings.

It should be appreciated that these embodiments are different but are not necessarily exclusive. The terms used in these embodiments should be defined not simply by the names of the terms but by their meanings and the overall context of the present specification. In these embodiments, the connection between two components or portions may include not only the direct connection therebetween but also the indirect connection therebetween. Throughout the drawings, the same reference numerals are used to designate the same or similar components or portions.

FIG. 1 illustrates the operation of an information insertion apparatus according to an embodiment of the present invention.

The information insertion apparatus 100 may insert information into a target.

The information may be inserted in the form of a set of at least one dot. In other words, the information insertion apparatus 100 may be a dot-based information insertion apparatus using a dot in the insertion of information.

The information insertion apparatus 100 may receive information. The information insertion apparatus 100 may generate a target, into which information has been inserted, by inserting the information into the target.

The target may include electronic data and an object. For example, the target may be electronic data, such as an image, a moving image, a photograph, an electronic document, or a monitor screen. Furthermore, the target may be an actual object, such as a photograph, a film, or printed matter.

The information may refer to content that a user attempts to insert into the target. The information may be information about the owner of a target, information about time, and information about a location. In this case, the time may refer to the time at which information is inserted into a target. The location may refer to the location of a user or the information insertion apparatus 100 at which the information is inserted into the target.

The information insertion apparatus 100 may represent information using a set of at least one dot. The set of at least one dot may be a set of at least one dot disposed on a two-dimensional plane. Each dot of the set of at least one dot may have coordinates. The coordinates may be relative values for the origin of the two-dimensional plane.

Alternatively, the set of at least one dot may be a set of at least one dot within an image. Each dot of the set of at least one dot may have coordinates within the image. The coordinates may be relative values for the origin of the image. The image may be an image of the set of at least one dot or an image of the target.

The set of at least one dot may have regular intervals or irregular intervals. In other words, at least one dot may be disposed at regular intervals or irregular intervals.

The information insertion apparatus 100 may convert the set of at least one dot into color and texture that match the target.

The information insertion apparatus 100 may output a set of at least one dot to the target. The information insertion apparatus 100 may generate the target, into which information has been inserted, by outputting a set of at least one dot to the target.

The target into which information has been inserted may include electronic data and an object. For example, the target may be electronic data, such as an electronic document on which an image of a set of at least one dot has been printed, or a monitor screen on which an image of a set of at least one dot has been displayed. Furthermore, the target may be an object, such as printed matter on which an image of a set of at least one dot has been printed.

Figure 2:
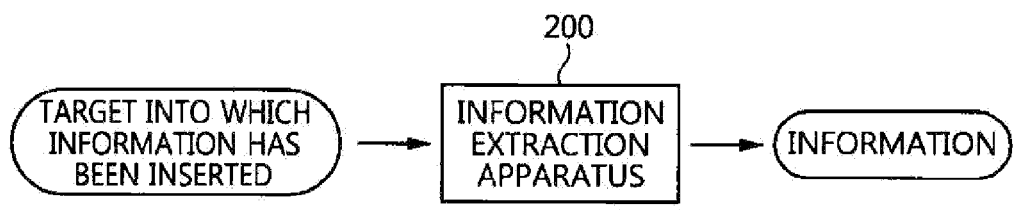
FIG. 2 is a diagram illustrating the operation of an information extraction apparatus according to an embodiment of the present invention.

FIG. 2 illustrates the operation of an information extraction apparatus according to an embodiment of the present invention.

The information extraction apparatus 200 may extract information from a target into which information has been inserted.

The information may be inserted in the form of a set of at least one dot. The target into which the information has been inserted may have information inserted in the form of a set of at least one dot. In other words, the information extraction apparatus 200 may be a dot-based information extraction apparatus for extracting information inserted using a dot.

The information extraction apparatus 200 may identify a set of at least one dot output to a target. The information extraction apparatus 200 may detect information from the identified set of at least one dot.

A target into which information has been inserted may include electronic data and an object. For example, the target may be electronic data, such as an electronic document or a monitor screen. Furthermore, the target may be an actual object, such as printed matter.

If the target is electronic data, the information extraction apparatus 200 may receive the electronic data of the target. The information extraction apparatus 200 may detect information by analyzing a set of at least one dot in the electronic data of a target.

If the target is an object, the information extraction apparatus 200 may generate the electronic data of the target by photographing the target. If the electronic data of the target is generated, the information extraction apparatus 200 may detect information by analyzing a set of at least one dot in the electronic data of the target.

In order to photograph the target, an image photographer, such as a camera, a scanner, a smart phone or an infrared camera, may be used. The image photographer may be part of the information extraction apparatus 200. In this case, the photographing of the target may be a task of acquiring the data of an image of the target.

Information may refer to content inserted into the target by a user. The information may be information about the owner of a target, information about time, and information about a location. In this case, the time may refer to the time at which the information is inserted into the target. The location may refer to the location of a user or the information insertion apparatus 100 when information is inserted into the target.

In the target, the information may be represented in the form of a set of at least one dot. The set of at least one dot may be a set of at least one dot disposed on a two-dimensional plane. Each dot of the set of at least one dot may have coordinates. The coordinates may be relative values for the origin of the two-dimensional plane.

Alternatively, the set of at least one dot may be a set of at least one dot within an image. In this case, the image including the set of dots may be an image indicative of the target, or may be an image extracted from the data of the target using a predetermined image extraction method. Each dot of the set of at least one dot may have coordinates within the image. The coordinates may be relative values for the origin of the image.

The set of at least one dot may have regular intervals or irregular intervals. In other words, the at least one dot may be disposed at regular intervals or irregular intervals.

The information extraction apparatus 200 may extract information from a set of at least one dot that matches the color and texture of the target.

Figure 3:
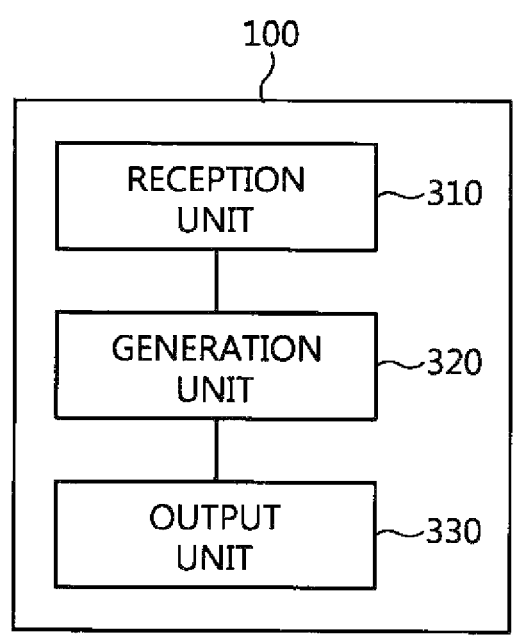
FIG. 3 is a diagram illustrating the configuration of an information insertion apparatus according to an embodiment of the present invention.

FIG. 3 is a diagram illustrating the configuration of an information insertion apparatus according to an embodiment of the present invention.

The information insertion apparatus 100 may include a reception unit 310, a generation unit 320, and an output unit 330.

As illustrated in FIG. 3, the information insertion apparatus 100 according to the present embodiment may include the reception unit 310, the generation unit 320, and the output unit 330. According to an embodiment, at least some of the reception unit 310, the generation unit 320, and the output unit 330 may be program modules, and may communicate with an external device or system. These program modules may be included in the information insertion apparatus 100 in the form of an operating system, an application program module, and other program modules, and may be physically stored in various known storage devices. Furthermore, at least some of the program modules may be stored in a remote storage device that is capable of communicating with the information insertion apparatus 100. Although the program modules may include a routine, a subroutine, a program, a target, a component, and a data structure that perform a specific task or execute a specific abstraction data type to be described later according to an embodiment of the present invention, they are not limited thereto. The program modules may include instructions that are executed by at least one processor of the information insertion apparatus 100.

The functions of the reception unit 310, the generation unit 320, and the output unit 330 according to an example are described in detail below with reference to FIG. 4.

Figure 4:
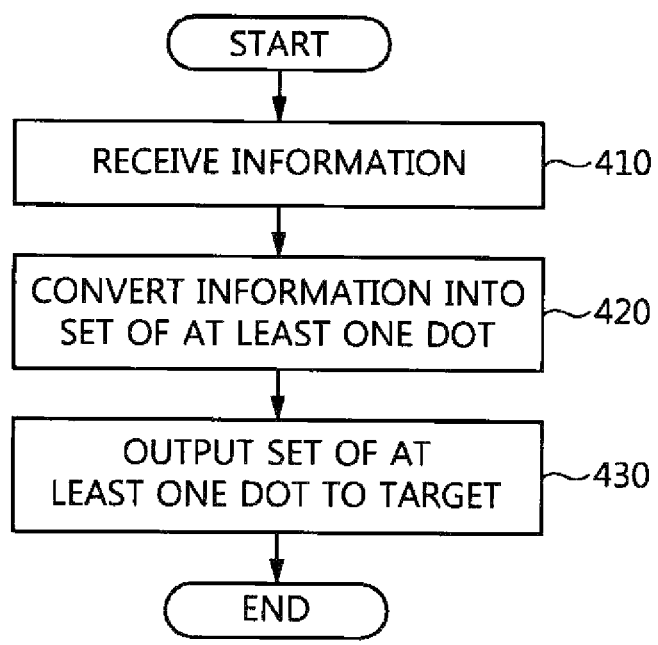
FIG. 4 is a flowchart illustrating an information insertion method according to an embodiment of the present invention.

FIG. 4 is a flowchart illustrating an information insertion method according to an embodiment of the present invention.

At step 410, the reception unit 310 may receive information.

At step 420, the generation unit 320 may convert the information into a set of at least one dot. The generation unit 320 may generate the set of at least one dot indicative of the information.

The set of at least one dot may be represented in the form of an image. The generation unit 320 may generate an image including the at least one dot indicative of the information.

For example, a method of converting information into a set of at least one dot is described in detail below with reference to FIG. 5.

At step 430, the output unit 330 may output a set of at least one dot to the target.

The output unit 330 may output an image, including at least one dot, to the target.

For example, a method of outputting a set of at least one dot to a target is described in detail below with reference to FIG. 10.

Hereinafter, the terms "set of at least one dot," "image of the target" and "image including at least one dot" may be used as having the same meaning according to circumstances, and may be interchangeably used without a particular mention.

As described above, the target may be electronic data. If the target is electronic data, the output unit 330 may convert the data of the target so that the set of at least one dot can be inserted into the target at step 430. Alternatively, the output unit 330 may convert the data of the target so that an image including the set of at least one dot can be inserted into the target. Through this conversion, the data of the target may represent a set of at least one dot, together with the existing target.

Furthermore, as described above, the target may be an object. If the target is an object, the output unit 330 may represent a set of at least one dot in the target at step 430. The output unit 330 may add a substance, indicative of the set of at least one dot, to the target. For example, the substance may be the toner or ink of a printer. A toner or ink of a predetermined color may be used to represent the set of at least one dot.

The output unit 330 may add a substance, which is perceptible under a predetermined type of light, to the target. In other words, the substance that has been added to the target and that is indicative of the set of at least one dot may not be identified by a user and the information extraction apparatus 200 under a common environment. The user and the information extraction apparatus 200 may identify the substance that has been added to the target and that is indicative of the set of at least one dot only when a predetermined type of light is shined on the target.

The output unit 330 may display the set of at least one dot on the target using a printing method. The output unit 330 may be a printer, or may include a printer. Furthermore, the output unit 330 may control the printer so that the set of at least one dot is displayed on the target. In this case, the information insertion apparatus 100 may further include a printer.

Figure 5:
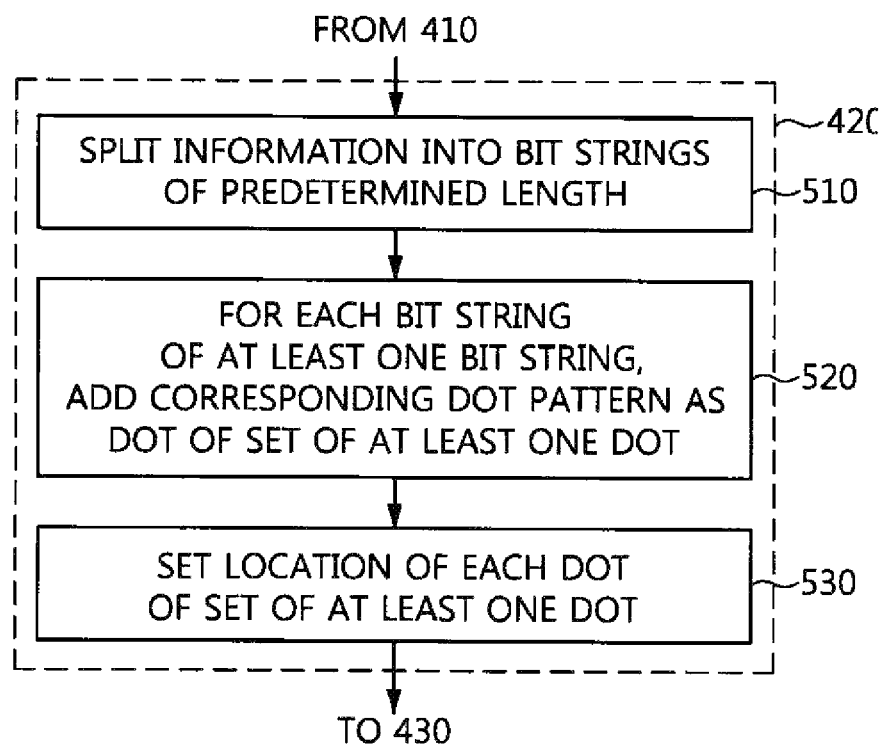
FIG. 5 is a flowchart illustrating a method of converting information into a set of at least one dot according to an example.

FIG. 5 is a flowchart illustrating a method of converting information into a set of at least one, dot according to an example.

Step 420 described above with reference to FIG. 4 may include the following steps 510, 520 and 530.

Information may be represented in the form of at least one bit string.

At step 510, the generation unit 320 may split information into at least one bit string of a predetermined length. The predetermined length may refer to the number of bits of a bit string. For example, the generation unit 320 may split the information into bit strings each having 1 bit. Alternatively, the generation unit 320 may split the information into bit strings each having two bits.

At step 520, the generation unit 320 may add, for each bit string of the at least one bit string, a dot pattern that corresponds to the each bit string among a plurality of different dot patterns as a dot of the set of at least one dot.

The plurality of dot patterns may have different forms of dots. A plurality of dot patterns according to an example is described in detail below with reference to FIGS. 6 to 9.

A dot pattern corresponding to a bit string may be a dot pattern corresponding to a value indicative of the bit string.

If the length of a bit string is n, the number of the plurality of dot patterns may be $2^n$. A plurality of dot patterns may be indicative of different values. For example, if the length of a bit string is 1, values that may be represented as a length of 1 bit may be "0" and "1." That is, two values may be represented as a length of 1 bit.

If the length of a bit string is 1, the first dot pattern of the plurality of dot patterns may correspond to a value "0", and the second dot pattern of the plurality of dot patterns may correspond to a value "1." If the value of a specific bit string is "0", a dot pattern corresponding to the bit string may be a dot pattern corresponding to the value "0." If the value of another bit string is "1", a dot pattern corresponding to the bit string may be a dot pattern corresponding to the value "1."

At step 530, the generation unit 320 may set the location of each of the set of at least one dot. The generation unit 320 may set the coordinate values of each of the set of at least one dot.

The generation unit 320 may dispose the at least one dot within an image at regular intervals. If the at least one dot is disposed at regular intervals, the information extraction apparatus 200 may obtain the location of each of the set of at least one dot within the image via a predetermined rule, predetermined information, or predetermined computation.

The generation unit 320 may dispose the at least one dot within an image at irregular intervals. If the at least one dot is disposed at irregular intervals, the information extraction apparatus 200 may identify each dot of the set of at least one dot within the image via a predetermined method.

Figure 6:
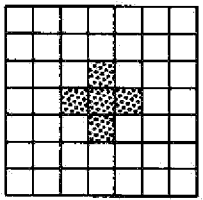
FIG. 6 is a diagram illustrating a plurality of dot patterns according to an example.

FIG. 6 illustrates a plurality of dot patterns according to an example.

FIG. 6 illustrates a dot pattern corresponding to the value "0" of a bit string and a dot pattern corresponding to the value "1" of the bit string.

As illustrated in FIG. 6, a plurality of dot patterns may have a form indicative of a dot. The plurality of dot patterns may be different in at least one of form, size, color, and alpha. FIG. 6 illustrates two dot patterns having different forms and sizes.

A plurality of dot patterns may be placed at the center of a region having a predetermined size.

A plurality of dot patterns may have a predetermined color value. The generation unit 320 may use a predetermined color value only to display a plurality of dot patterns in an image. For example, the plurality of dot patterns may have the red, green and blue (RGB) color value "0x000000" in hexadecimal. The generation unit 320 may use a predetermined color value only to display a plurality of dot patterns, and may convert another portion of an image having a predetermined color value other than the plurality of dot patterns into another value similar or approximate to the predetermined color value. For example, the generation unit 320 may change the color value of a portion, which belongs to the data of the target and which corresponds to "0x000000," into "0x010101."

Figure 7:
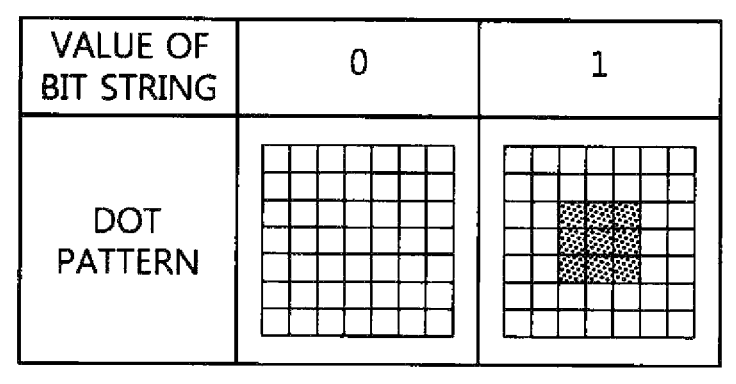

FIG. 7 illustrates a dot pattern not having a form according to an example.

FIG. 7 illustrates a dot pattern corresponding to the value "0" of a bit string and a dot pattern corresponding to the value "1" of the bit string. As illustrated in FIG. 7, the dot pattern corresponding to the value "0" may not have a form. One of a plurality of dot patterns may not have a form.

In order to use a dot pattern not having a form, the generation unit 320 may dispose at least one dot within an image at regular intervals. The information extraction apparatus 200 may obtain the location of each dot of a set of at least one dot within an image via computation. Once the location of each dot has been obtained, the information extraction apparatus 200 may set a value, represented by a dot pattern not having a form, as the value of a bit string corresponding to the obtained location if a dot is not detected at the obtained location.

Alternatively, a dot pattern not having a form may have a value that is not seen by a naked eye but is represented and identified in terms of data.

Figure 8:
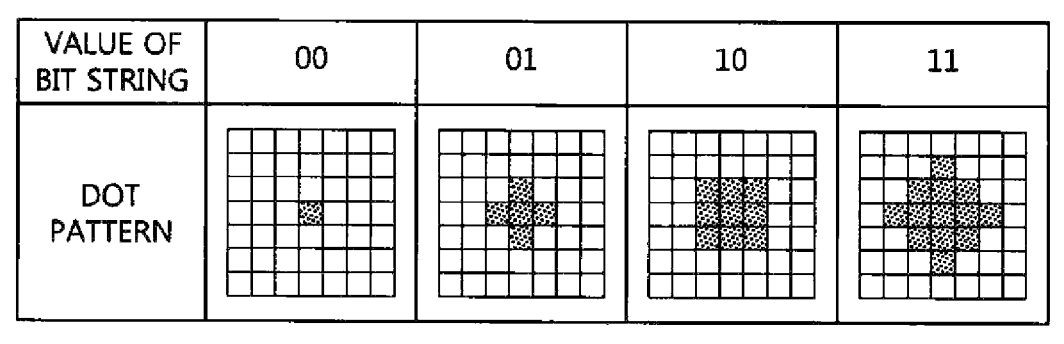

FIG. 8 illustrates a plurality of dot patterns of a bit string having a length of 2 according to an example.

FIG. 8 illustrates a dot pattern corresponding to the bit string value "00," a dot pattern corresponding to the bit string value "01," a dot pattern corresponding to the bit string value "10," and a dot pattern corresponding to the bit string value "11."

As illustrated in FIG. 8, a plurality of dot patterns may have forms indicative of a dot. The plurality of dot patterns may be different in at least one of form, size, color, and alpha. FIG. 8 illustrates four dot patterns having different forms and sizes.

Figure 9:
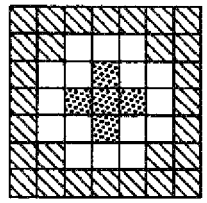
FIG. 9 is a diagram illustrating a plurality of dot patterns having two or more colors according to an example.
Figure 9:
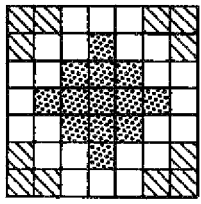

FIG. 9 illustrates a plurality of dot patterns each having two or more colors according to an example.

FIG. 9 illustrates a dot pattern corresponding to the value "0" of a bit string and a dot pattern corresponding to the value "1" of the bit string.

In these dot patterns, a portion filled with a dot may represent a dark portion, a portion not filled with any dot may represent a white portion, and a hatched portion may represent a transparent portion.

In order to distinguish corresponding content from other content within an image, each of a plurality of dot patterns may include two or more colors and include a transparent color. Since each pattern includes two or more colors, the information extraction apparatus 200 may easily identify at least one dot even when the at least one dot is disposed at irregular intervals within the image.

Figure 10:
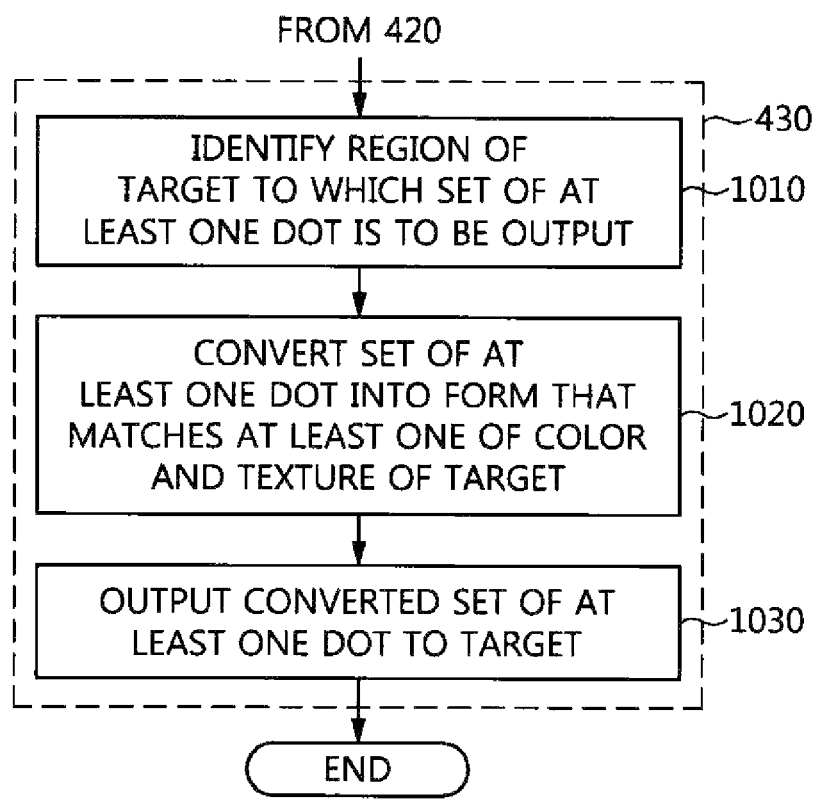
FIG. 10 is a flowchart illustrating a method of outputting a set of at least one dot to a target according to an example.

FIG. 10 is a flowchart illustrating a method of outputting a set of at least one dot to a target according to an example.

At step 1010, the output unit 330 may identify a region of a target to which a set of at least one dot is to be output. The output unit 330 may determine a region of the target to which a set of at least one dot is to be output.

At step 1020, the output unit 330 may convert the set of at least one dot into a form that matches at least one of the color and texture of the target. The output unit 330 may convert the set of at least one dot into a barely perceptible form or an imperceptible form in terms of at least one of the color and texture of the target.

The output unit 330 may convert the set of at least one dot into a barely perceptible form or an imperceptible form for naked eyes in terms of at least one of the color and texture of the target. In this case, the barely perceptible form or imperceptible form may refer to a form that is barely identified or cannot be identified by the naked, eyes of a user but can be identified by the information extraction apparatus 200. For example, if the color value of the background color of an electronic document is the hexadecimal number "0x000000", the output unit 330 may convert the color value of the color of a set of at least one dot into the hexadecimal number "0x010101."

The conversion of a form may be performed on the region identified or determined at step 1010. The output unit 330 may convert the set of at least one dot into a barely perceptible form or an imperceptible form in terms of at least one of the color and texture of the region. For example, the output unit 330 may convert the set of at least one dot into a color that is similar to or the same as the color of the region, and may convert the set of at least one dot into texture that is similar to or the same as the texture of the region.

At, step 1030, the output unit 330 may output the converted set of at least one dot to the target.

The output to the target may be performed on the region identified or determined at step 1010. The output unit 330 may output the converted set of at least one dot to the region.

Figure 11:
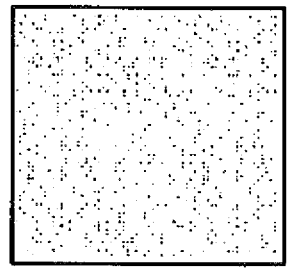
FIG. 11 is a diagram illustrating a set of at least one dot according to an example.

FIG. 11 illustrates a set of at least one dot according to an example.

As illustrated in FIG. 11, a set of at least one dot may be a set of at least one dot disposed on a two-dimensional plane. Furthermore, the set of at least one dot may be a set of at least one dot within an image.

Figure 12:
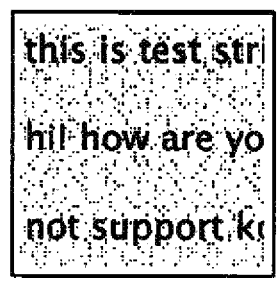
FIG. 12 is a diagram illustrating a target into which a set of at least one dot has been inserted according to an example.

FIG. 12 illustrates a target into which a set of at least one dot has been inserted according to an example.

As illustrated in FIG. 12, a set of at least one dot may be inserted into an electronic image. The target may be an image indicative of text. A set of at least one dot indicative of information may be inserted as the background of an image.

As illustrated in FIG. 12, if the target is an image, a moving image, a photograph, an electronic document or a monitor screen, the output unit 330 may insert a set of at least one dot as the background of the target.

Figure 13:
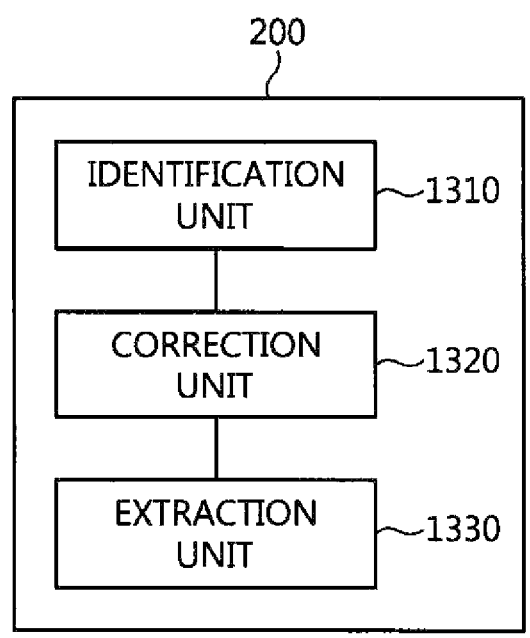
FIG. 13 is a diagram illustrating the configuration of an information extraction apparatus according to an embodiment of the present invention.

FIG. 13 is a diagram illustrating the configuration of an information extraction apparatus 100 according to an embodiment of the present invention.

The information extraction apparatus 200 may include an identification unit 1310, a correction unit 1320, and an extraction unit 1330.

As illustrated in FIG. 13, the information extraction apparatus 200 according to the present embodiment may include the identification unit 1310, the correction unit 1320, and the extraction unit 1330. According to an embodiment, at least some of the identification unit 1310, the correction unit 1320, and the extraction unit 1330 may be program modules, and may communicate with an external device or system. The program modules may be included in the information extraction apparatus 200 in the form of an operating system, an application program module, or other program modules, and may be physically stored in various known storage devices. Furthermore, at least some of the program modules may be stored in a remote storage device that is capable of communicating with the information extraction apparatus 200. Although the program modules may include a routine, a subroutine, a program, a target, a component, and a data structure that perform a specific task or execute a specific abstraction data type to be described later according to an embodiment of the present invention, they are not limited thereto. The program modules may include instructions that are executed by at least one processor of the information extraction apparatus 200.

The functions of the identification unit 1310, the correction unit 1320, and the extraction unit 1330 according to an example are described in detail below with reference to FIG. 14.

Figure 14:
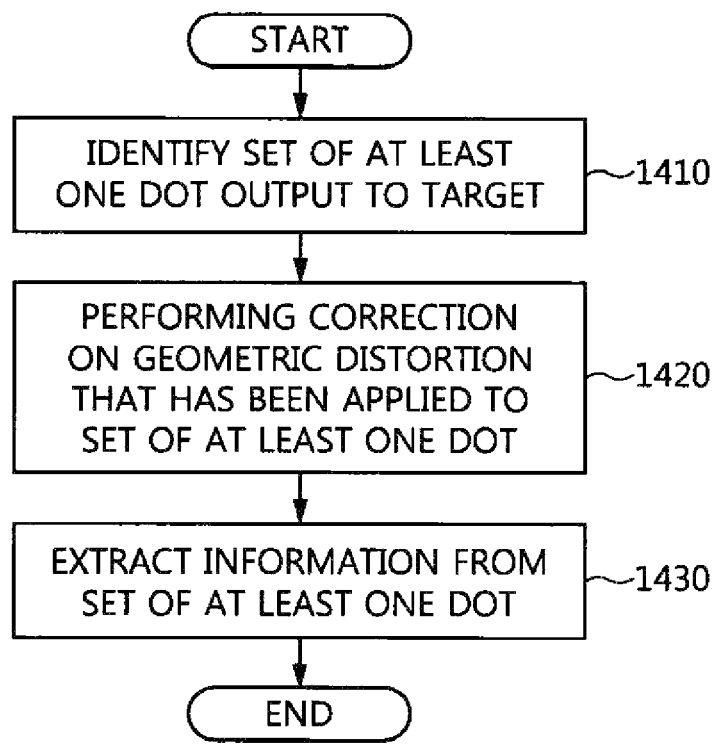
FIG. 14 is a flowchart illustrating an information extraction method according to an embodiment of the present invention.

FIG. 14 is a flowchart illustrating an information extraction method according to an embodiment of the present invention.

In the following description, a set of at least one dot indicative of information may have been inserted into a target by the information insertion apparatus 100.

At step 1410, the identification unit 1310 may identify the set of at least one dot output to the target.

For example, the identification unit 1310 may identify a predetermined dot pattern in the target as a dot. Furthermore, the identification unit 1310 may identify an object on a predetermined location in an image of the target as a dot. Furthermore, the identification unit 1310 may identify a part of an image of the target having a predetermined form, shape, color, or alpha as a dot.

The identification unit 1310 may extract an image only consisting of the set of at least one dot from the image of the target.

The identification unit 1310 may obtain an image, including the set of at least one dot, from the target, and may obtain the set of at least one dot by thresholding the obtained image. For example, the identification unit 1310 may identify a predetermined region within the obtained image as a set of at least one dot. In this case, the predetermined region may be a region whose color value or alpha value is equal to or larger than a predetermined value, a region whose color value or alpha value is equal to or smaller than a predetermined value, or a region whose color value or alpha value falls within a predetermined range.

At step 1420, the correction unit 1320 may correct geometric distortion that has been applied to the set of at least one dot.

Geometric distortion occurring in a process of adding or obtaining the set of at least one dot may be corrected by the correction unit 1320.

A method of performing correction on geometric distortion that has been applied to a set of at least one, dot according to an example is described in detail later with reference to FIG. 16.

At step 1430, the extraction unit 1330 may extract information from the set of at least one dot.

A method of extracting information from a set of at least one dot according to an example is described in detail later with reference to FIG. 21.

As described above, the target may be electronic data. If the target is electronic data, the identification unit 1310 may receive the electronic data of the target from an external another device at step 1410. Furthermore, the identification unit 1310 may detect a set of at least one dot within the target by analyzing the data of the target.

Furthermore, as described above, the target may be an object. A method by which the identification unit 131 identifies a set of at least one dot output to a target if the target is an object is described in detail below with reference to FIG. 15.

Figure 15:
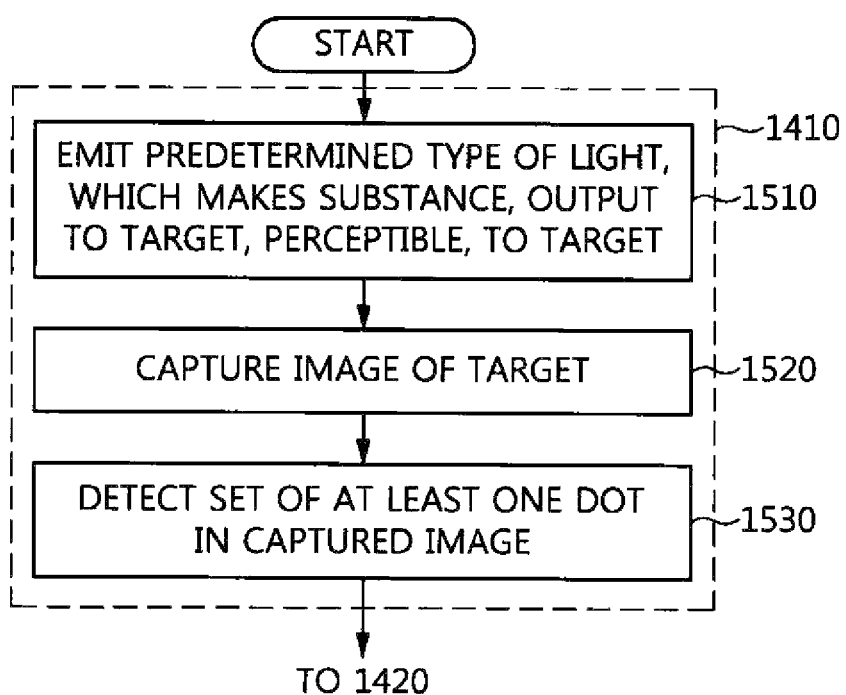
FIG. 15 is a flowchart illustrating a method of identifying a set of at least one dot output to a target according to an example.

FIG. 15 is a flowchart illustrating a method of identifying a set of at least one dot output to a target according to an example.

Step 1410 described above with reference to FIG. 14 may include the following steps 1510, 1520 and 1530.

At step 1510, the identification unit 1310 may emit a predetermined type of light, which makes a substance, output to the target, perceptible, to the target.

As described above, a set of at least one dot may be added to the target as a substance that is perceptible under a predetermined type of light. In this case, the predetermined type of light may need to be projected onto the target so that the set of at least one dot is exposed out of the target.

The identification unit 1310 may be a lighting device, or may include a lighting device. Furthermore, the identification unit 1310 may control the lighting device so that a predetermined type of light that makes a substance, output to the target, perceptible is emitted to the target. In this case, the information extraction apparatus 200 may further include a lighting device.

At step 1520, the identification unit 1310 may capture an image of the target.

The identification unit 1310 may be an image photographer, or may include an image photographer. Alternatively, the identification unit 1310 may control an image photographer so that it captures an image of the target. In this case, the information extraction apparatus 200 may further include an image photographer. The image photographer may include a camera, a scanner, a smart phone, or an infrared camera.

At step 1530, the identification unit 1310 may detect the set of at least one dot in the captured image.

Figure 16:
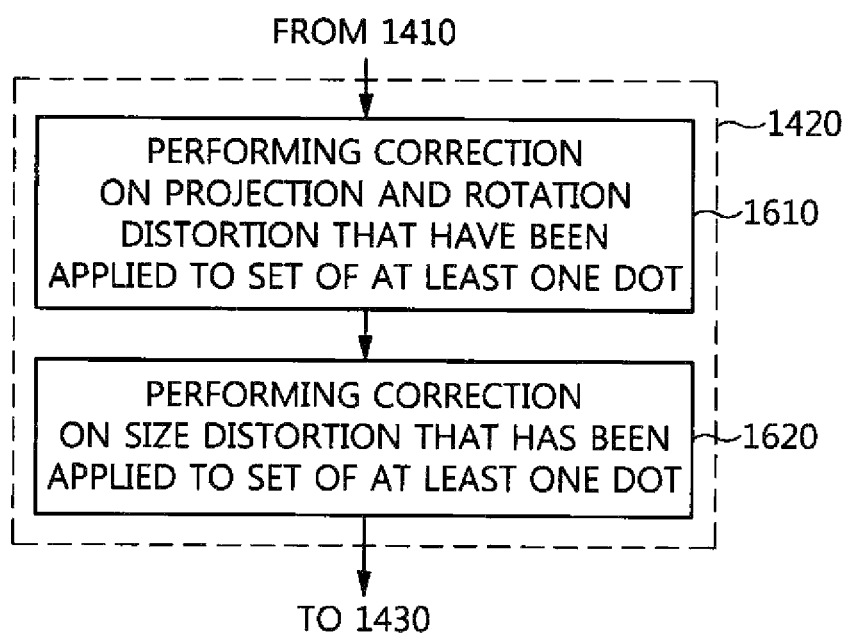
FIG. 16 is a flowchart illustrating a method of performing correction on geometric distortion that has been applied to a set of at least one dot according to an example.

FIG. 16 is a flowchart illustrating a method of performing correction on geometric distortion that has been applied to a set of at least one dot according to an example.

Step 1420 described above with reference to FIG. 14 may include the following steps 1610 and 1620.

At step 1610, the correction unit 1320 may perform correction on projection and rotation distortion that have been applied to a set of at least one dot.

A method of performing correction on projection and rotation distortion that have been applied to a set of at least one dot according to an example is described in detail below with reference to FIG. 17.

At step 1620, the correction unit 1320 may perform correction on size distortion that has been applied to a set of at least one dot.

A method of performing correction on size distortion that has been applied to the set of at least one dot according to an example is described in detail later with reference to FIG. 19.

Figure 17:
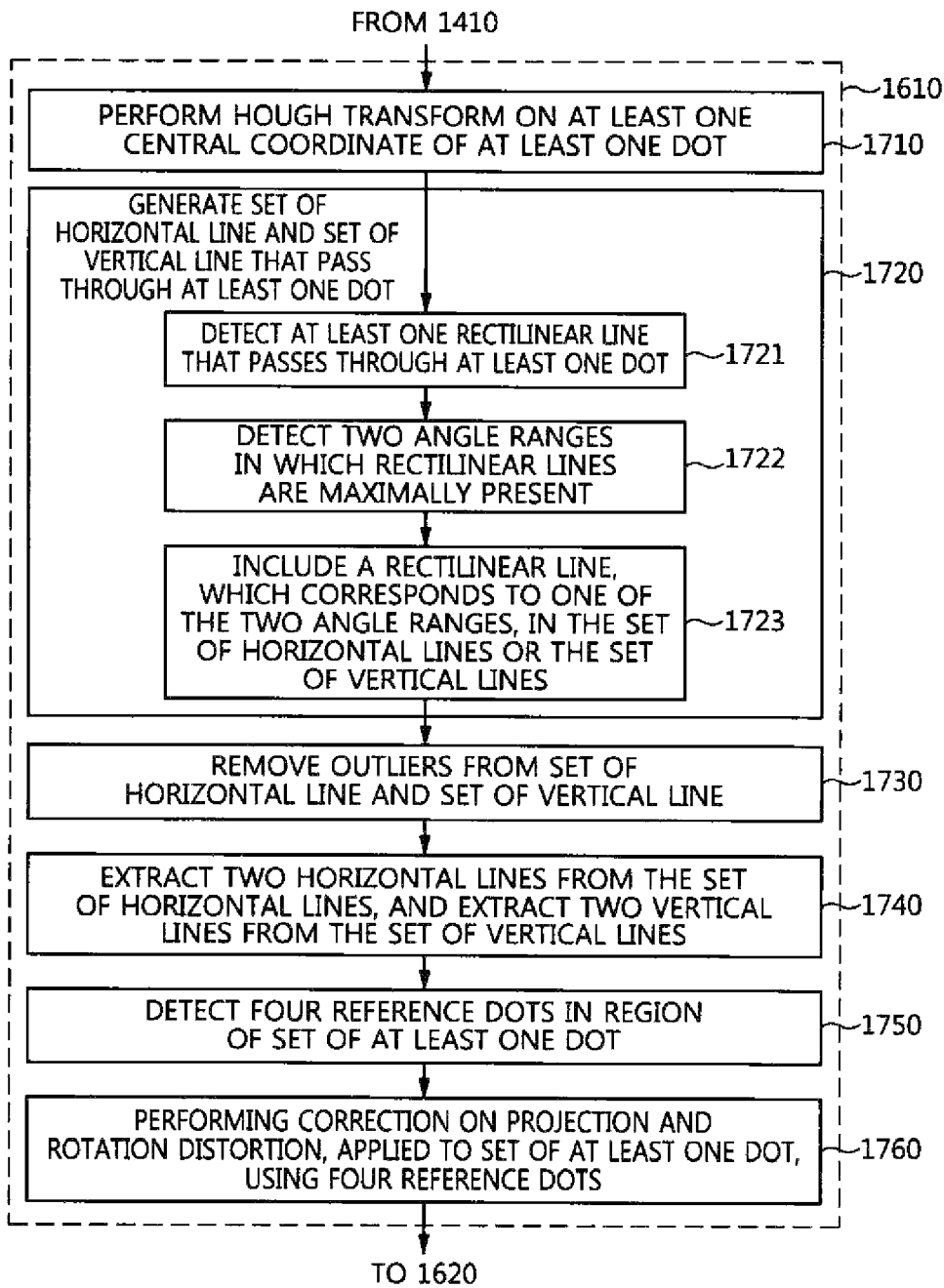
FIG. 17 is a flowchart illustrating a method of performing correction on projection and rotation distortion that have been applied to a set of at least one dot according to an example.

FIG. 17 is a flowchart illustrating a method of performing correction on projection and rotation distortion that have been applied to a set of at least one dot according to an example.

Step 1610 described above with reference to FIG. 16 may include the following steps 1710, 1720, 1730, 1740, 1750 and 1760.

At step 1710, the correction unit 1320 may perform Hough transform on at least one central coordinate of the identified at least one dot.

At step 1720, the correction unit 1320 may generate a set of a horizontal line and a set of a vertical line that pass through at least one dot.

The horizontal line and the vertical line that pass through the at least one dot may be rectilinear lines that pass through at least one central coordinate of the at least one dot to which Hough transform has been applied. For example, the horizontal line and the vertical line that pass through the at least one dot may be rectilinear lines that pass through two or more central coordinates of the at least one central coordinate to which Hough transform has been applied. Horizontal lines and vertical lines passing through the at least one dot may be horizontal lines and vertical lines passing through the at least one central coordinate to which the Hough transform has been applied.

Step 1720 may include the following steps 1721, 1722 and 1723.

At step 1721, the correction unit 1320 may detect at least one rectilinear line that passes through the at least one dot.

The rectilinear line that passes through the at least one dot may pass at least one central coordinate of the at least one dot to which Hough transform has been applied. For example, the rectilinear line that passes through the at least one dot may pass two or more central coordinates of the dots to which Hough transform has been applied.

At step 1722, the correction unit 1330 may detect two angle ranges in which rectilinear lines are maximally present.

The two angle ranges may be an angle range for vertical lines and an angle range for horizontal lines. The correction unit 1330 may detect two angle ranges, in which the rectilinear lines are maximally present, as an angle range for horizontal lines and an angle range for vertical lines. Alternatively, the correction unit 1330 may detect an angle range, in which rectilinear lines that may be considered to be horizontal lines are maximally present, as an angle range for horizontal lines, and may detect an angle range, in which rectilinear lines that may be considered to be vertical lines are maximally present, as an angle range for vertical lines.

At step 1723, the correction unit 1330 may include rectilinear lines, which correspond to one of the two angle ranges, in the set of horizontal lines or the set of vertical lines. More specifically, the correction unit 1330 may include a rectilinear line, which corresponds to the angle range for horizontal lines, in the set of horizontal lines. The correction unit 1330 may include a rectilinear line, which corresponds to the angle range for vertical lines, in the set of vertical lines.

At step 1730, the correction unit 1320 may remove outliers from the set of horizontal lines and the set of vertical lines. The correction unit 1320 may consider horizontal lines or vertical lines of the set of horizontal lines or the set of vertical lines, which correspond to a predetermined condition, to be outliers, and may remove the horizontal lines or vertical lines, from the set of horizontal lines or the set of vertical lines.

At step 1740, the correction unit 1320 may extract two horizontal lines from the set of horizontal lines, and may extract two vertical lines from the set of vertical lines.

The two horizontal lines may include a horizontal line closest to the origin and a horizontal line farthest from the origin. The two vertical lines may include a vertical line closest to the origin and a vertical line farthest from the origin.

At step 1750, the correction unit 1320 may detect four reference dots in the set of at least one dot.

The four reference dots may be the intersections of the two horizontal lines and the two vertical lines.

At step 1760, the correction unit 1320 may correct projection and rotation distortion that have been applied to the set of at least one dot using the four reference dots.

For example, the correction unit 1320 may convert the region of the set of at least one dot so that the four reference dots become a rectangle composed of the horizontal lines and the vertical lines. Alternatively, the correction unit 1320 may convert an image of the target so that the four reference dots become a rectangle composed of the horizontal lines and the vertical lines.

A process of performing correction on projection and rotation distortion that have been applied to a set of at least one dot is described below with reference to FIG. 18.

Figure 18:
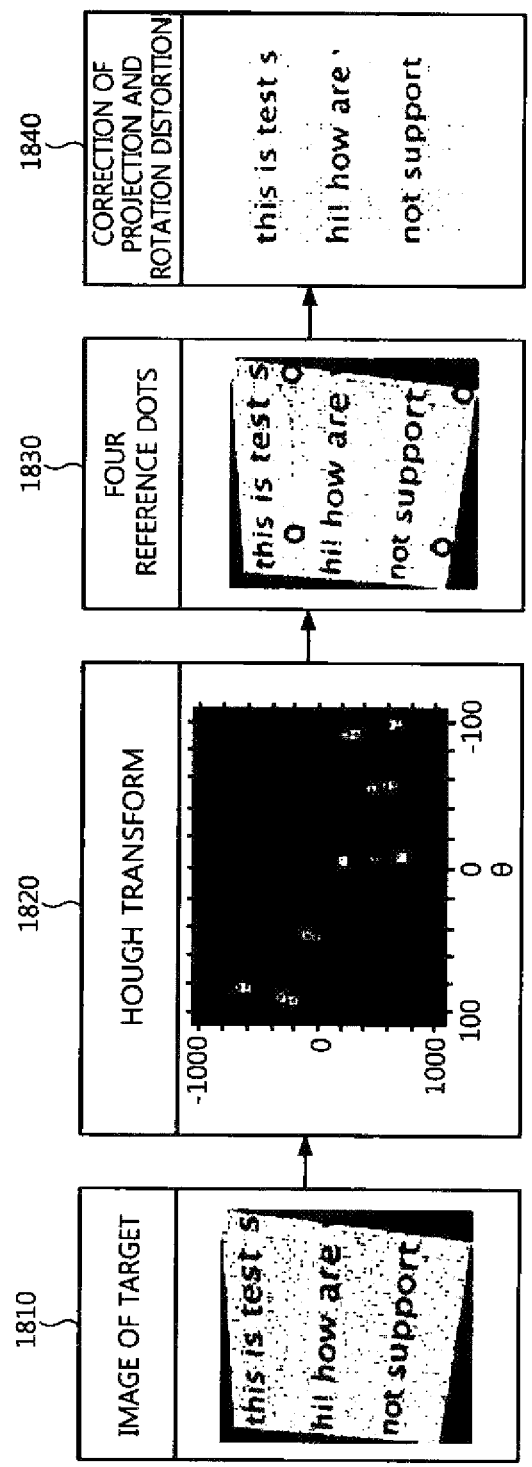
FIG. 18 is a view illustrating a process of performing correction on projection and rotation distortion that have been applied to a set of at least one dot according to an example.

FIG. 18 illustrates a process of performing correction on projection and rotation distortion that have been applied to a set of at least one dot according to an example.

A first FIG. 1810 illustrates an image of the target obtained by the information extraction apparatus 200.

A second FIG. 1820 illustrates a graph illustrating central coordinates to which Hough transform has been applied.

A third FIG. 1830 illustrates four reference dots extracted by the correction unit 1320.

A fourth FIG. 1840 illustrates an image of a target which uses the four reference dots and to which the correction of projection and rotation distortion has been applied.

Figure 19:
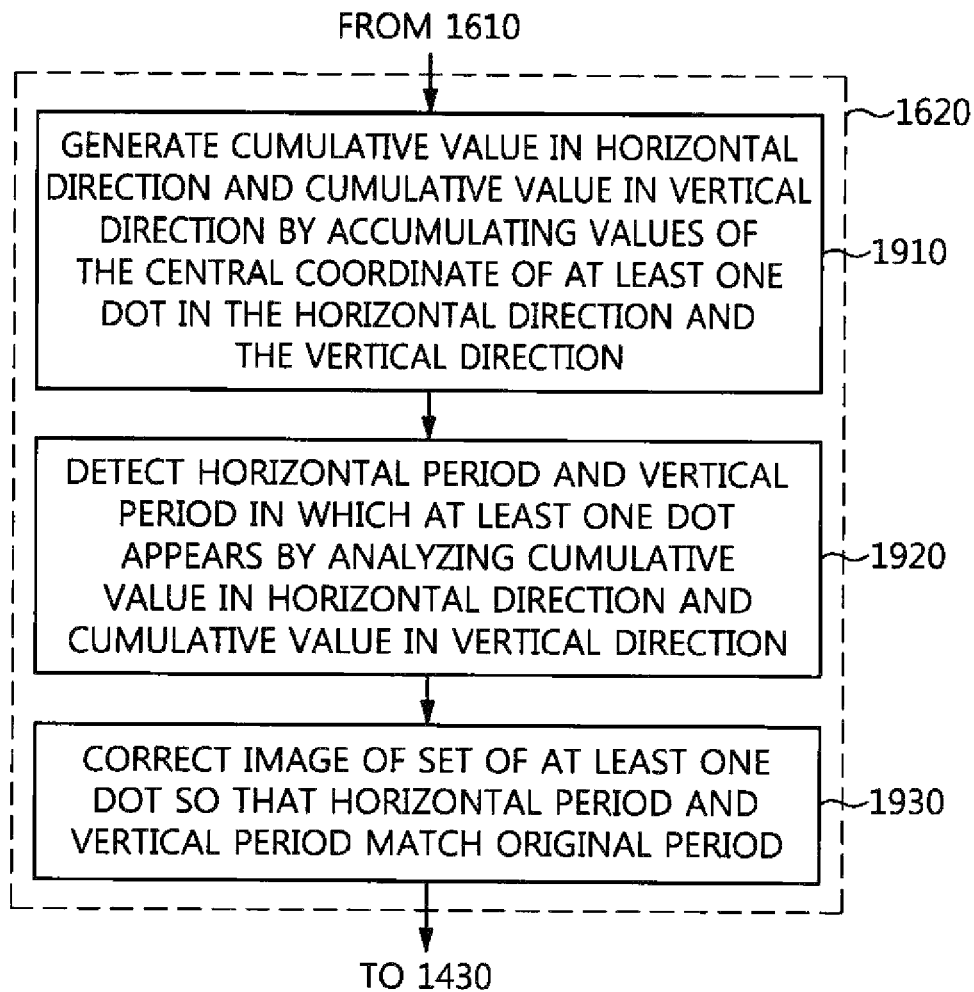
FIG. 19 is a flowchart illustrating a method of performing correction on size distortion that has been applied to a set of at least one dot according to an example.

FIG. 19 is a flowchart illustrating a method of performing correction on size distortion that has been applied to a set of at least one dot according to an example.

Step 1620 described above with reference to FIG. 16 may include the following steps 1910, 1920 and 1930.

At step 1910, the correction unit 1320 may generate a cumulative value in a horizontal direction and a cumulative value in a vertical direction by accumulating values of the central coordinate of at least one dot in the horizontal direction and the vertical direction.

At step 1920, the correction unit 1320 may detect a horizontal period and a vertical period in which the at least one dot appears, by analyzing the cumulative value in the horizontal direction and the cumulative value in the vertical direction.

The correction unit 1320 may detect a horizontal period and a vertical period in which the at least one dot appears by performing the frequency domain analysis of the cumulative value in the horizontal direction and the cumulative value in the vertical direction.

At step 1930, the correction unit 1320 may correct an image of the set of at least one dot so that the horizontal period and the vertical period match the original period. The correction unit 1320 may correct size distortion that has been applied to the set of at least one dot by correcting the horizontal period and the vertical period according to the original period.

The original period may refer to the interval at which at least one dot is disposed. The original period may include an original horizontal period and an original vertical period. The original horizontal period may refer to the horizontal interval at which at least one dot is disposed. The original vertical period may refer to the vertical interval at which at least one dot is disposed. The electronic data of a target may include information about the original period. Alternatively, the information extraction apparatus 200 may receive information about the original period from the information insertion apparatus 100, or may receive information about the original period through a user input.

A process of performing correction on size distortion that has been applied to a set of at least one dot is described below with reference to FIG. 20.

Figure 20:
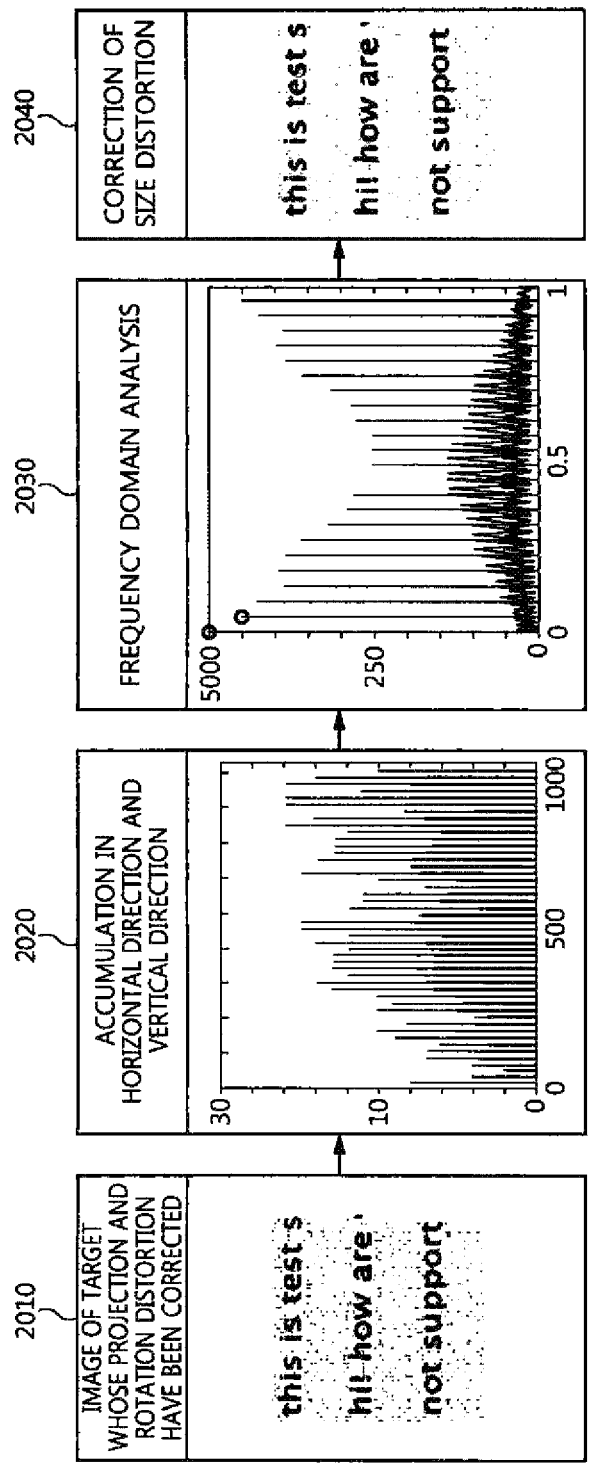
FIG. 20 is a view illustrating a process of performing correction on size distortion that has been applied to a set of at least one dot according to an example.

FIG. 20 illustrates a process of performing correction on size distortion that has been applied to a set of at least one dot according to an example.

A first FIG. 2010 illustrates an image of the target whose projection and rotation distortion have been corrected.

A second FIG. 2020 illustrates a graph in which the central coordinate of at least one dot has been accumulated in a horizontal direction and a vertical direction.

A third FIG. 2030 illustrates frequency domain analysis.

A fourth FIG. 2040 illustrates an image of a target to which the correction of size distortion has been applied.

Figure 21:
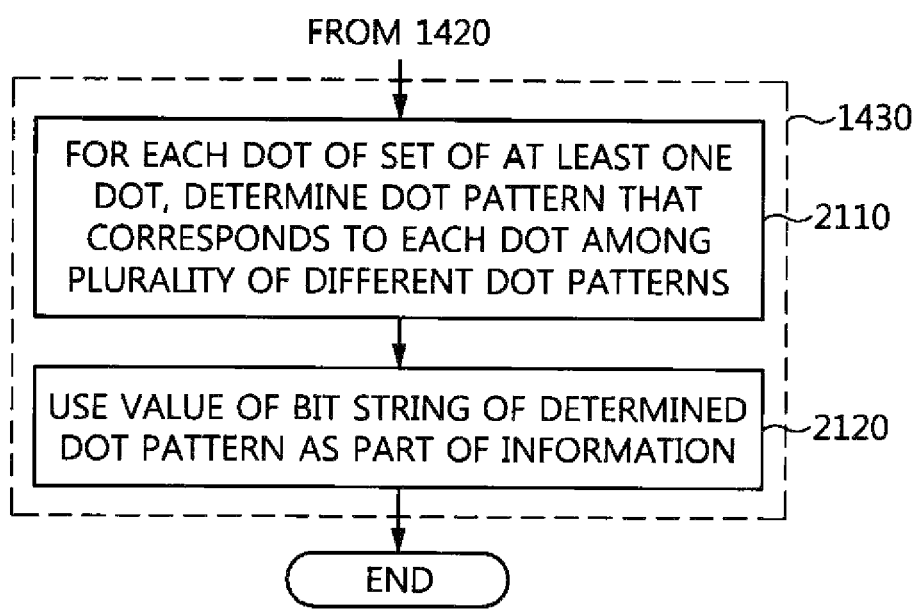
FIG. 21 is a flowchart illustrating a method of extracting information from a set of at least one dot according to an example.

FIG. 21 is a flowchart illustrating a method of extracting information from a set of at least one dot according to an example.

Step 1430 described above with reference to FIG. 14 may include the following steps 2110 and 2120.

At step 2110, the extraction unit 1330 may determine one of a plurality of different dot patterns that corresponds to each dot of a set of at least one dot.

The extraction unit 1330 may determine one of the plurality of different dot patterns that matches each dot as a dot pattern corresponding to the corresponding dot.

For example, the form of a dot may not be identical with that of a dot pattern due to distortion applied to an image of the target or an image of a set of at least one dot. The extraction unit 1330 may determine one of the plurality of different dot patterns, having the highest correlation coefficient for each dot, as a dot pattern corresponding to the corresponding dot. In this case, the correlation coefficient may refer to similarity between the form of a dot and the form of a dot pattern.

At step 2120, the extraction unit 1330 may use the value of the bit string of the determined dot pattern as at least part of the information.

If a dot pattern corresponding to each dot of the set of at least one dot is determined, the extraction unit 1330 may identify a value represented by each dot of the set of at least one dot. In this case, the value represented by each dot may be the value of a bit string.

Figure 22:
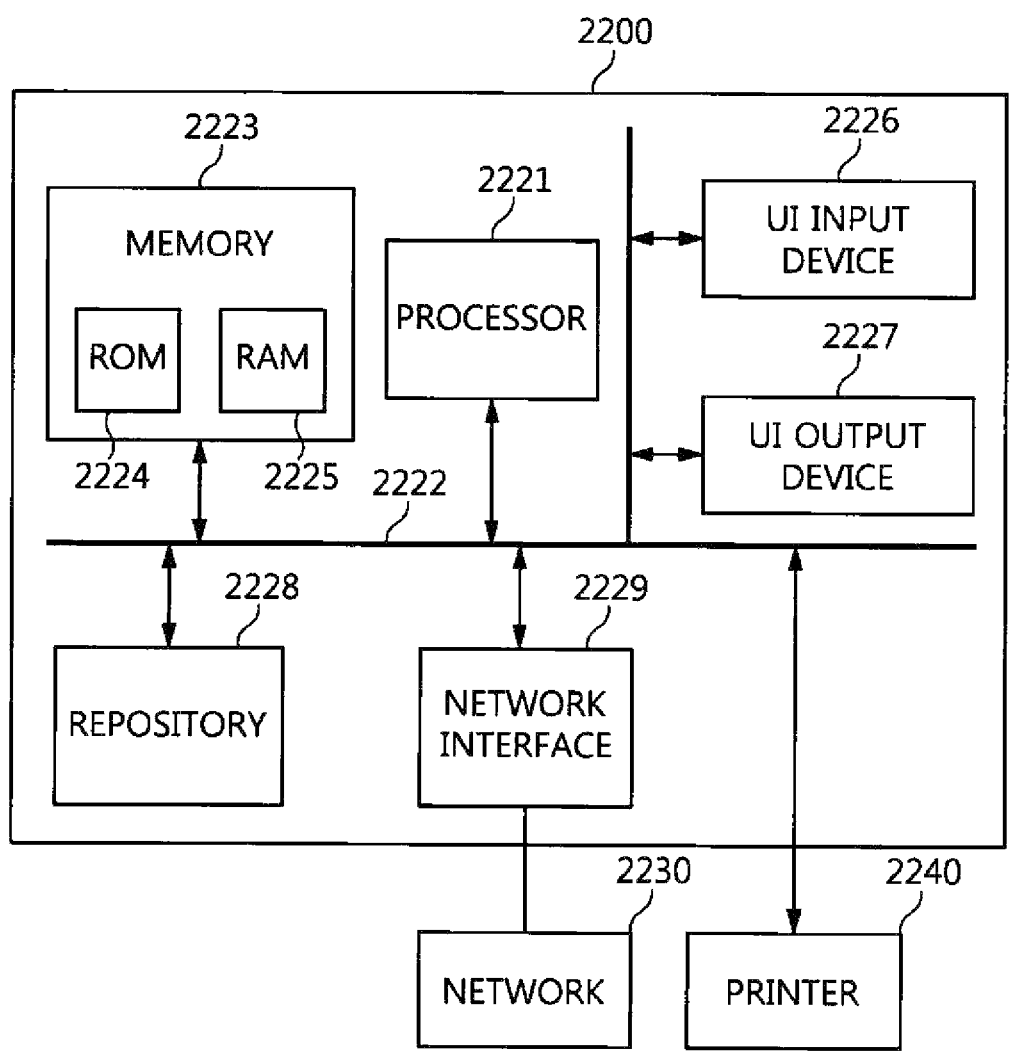
FIG. 22 is a diagram illustrating an electronic device that implements an information insertion apparatus according to an embodiment of the present invention.

FIG. 22 illustrates an electronic device that implements an information insertion apparatus according to an embodiment of the present invention.

The information insertion apparatus 100 may be implemented using as the electronic device 2200 of FIG. 22.

The information insertion apparatus 100 may be implemented in a computer system including a computer-readable recording medium. As illustrated in FIG. 22, the electronic device 2200 may include at least one processor 2221, at least one piece of memory 2223, at least one user interface (UI) input device 2226, at least one UI output device 2227, and at least one repository 2228 that communicate with each other via a bus 2222. The electronic device 2200 may further include a network interface 2229 connected to a network 2230. The processor 2221 may be a central processing unit (CPU) or semiconductor device configured to execute processing instructions stored in the memory 2223 or the repository 2228. The memory 2223 and the repository 2228 may be a variety of types of volatile or non-volatile storage media. For example, the memory may include ROM 2224 or RAM 2225.

The electronic device 2200 may further include a printer 2240.

At least one module of the information, insertion apparatus 100 may be stored in the memory 2223, and may be configured to be executed by at least one processor 2221. A function related to the communication of the data or information of the electronic device 2200 may be performed via the network interface 2229.

Figure 23:
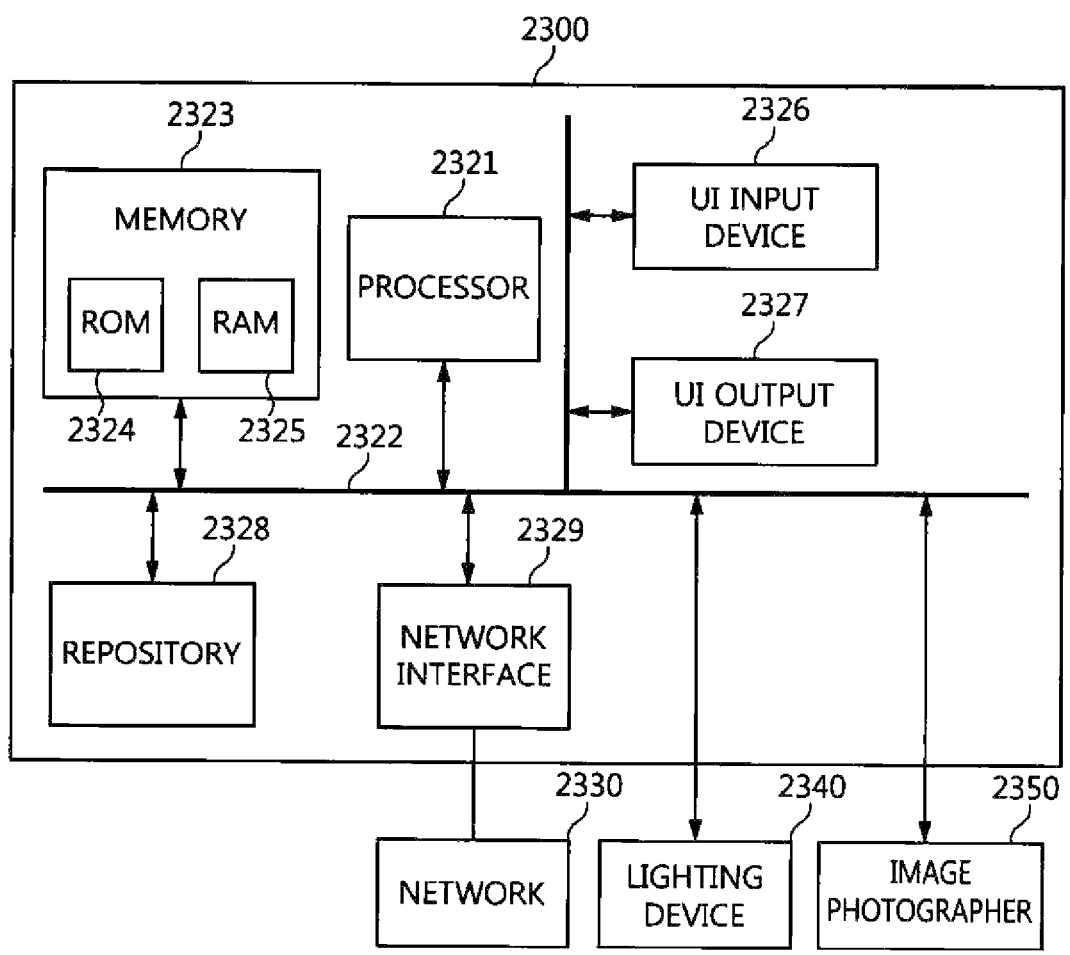
FIG. 23 is a diagram illustrating an electronic device that implements an information extraction apparatus according to an embodiment of the present invention.

FIG. 23 illustrates an electronic device that implements an information extraction apparatus according to an embodiment of the present invention.

The information extraction apparatus 200 may be implemented as the electronic device 2300 of FIG. 23.

The information extraction apparatus 200 may be implemented in a computer system including a computer-readable recording medium. As illustrated in FIG. 23, the electronic device 2300 may include at least one processor 2321, at least one piece of memory 2323, at least one UI input device 2326, at least one UI output device 2327, and at least one repository 2328 that communicate with each other via a bus 2322. The electronic device 2300 may further include a network interface 2329 connected to the network 2330. The processor 2321 may be a semiconductor device configured to execute processing instructions that are stored in a CPU, the memory 2323 or the repository 2328. The memory 2323 and the repository 2328 may be a variety of type of volatile or non volatile storage media. For example, the memory may include ROM 2324 or RAM 2325.

The electronic device 2300 may further include a lighting device 2340 and an image photographer 2350.

At least one module of the information extraction apparatus 200 may be stored in the memory 2323, and may be configured to be executed by the processor 2321. A function related to the communication of the data or information of the electronic device 2300 may be performed via the network interface 2329.

As described above, the present invention provides a method, apparatus, and system for inserting information into a target and extracting information from a target.

There are provided a method, apparatus, and system using a barely perceptible form or an imperceptible form in the insertion of information and the extraction of information.

There are provided a method, apparatus, and system for correcting geometric distortion that has been applied to an image of a target in the extraction of information.

There are provided a method and apparatus for converting information into a set of at least one dot and adding the set of at least one dot indicative of the information to an electronic document.

There are provided a method and apparatus for converting information into a set of at least one dot and adding the set of at least one dot indicative of the information to a monitor screen.

At least one embodiment of the present invention may be implemented as a computer program instructions that can be executed by various computer means or various computer components. The computer-readable storage medium may include program instructions, data files, and data structures solely or in combination. The computer program instructions stored on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and the vice versa.

Although the specific embodiments of the present invention have been disclosed for illustrative purposes, those skilled in the art will appreciate that various modifications, additions and substitutions are possible without departing from the scope and spirit of the invention as disclosed in the accompanying claims.

Therefore, the technical spirit of the present invention should not be defined based on only the above-described embodiments, but should be defined based on not only the attached claims but also all equivalents to the attached claims.

What is claimed is:

1. An information extraction method, comprising:
identifying a set of at least one dot output to a target;
extracting information from the set of at least one dot; and
performing correction on geometric distortion of the set of at least one dot, wherein:
performing correction on the geometric distortion comprises performing correction on projection and rotation distortion of the set of at least one dot;
performing correction on the projection and rotation distortion comprises detecting four reference dots in a region of the set of at least one dot and performing correction on the projection and rotation distortion using the four reference dots; and
performing correction on the projection and rotation distortion comprises generating a set of horizontal lines and a set of vertical lines passing through the at least one dot, extracting two horizontal lines from the set of horizontal lines, and extracting two vertical lines from the set of vertical lines;
the four reference dots are intersections of the two horizontal lines and the two vertical lines;
the two horizontal lines comprise a horizontal line closest to an origin and a horizontal line farthest from the origin; and
the two vertical lines comprise a vertical line closest to the origin and a vertical line farthest from the origin.

2. The information extraction method of claim 1, wherein identifying the set of at least one dot comprises detecting the set of at least one dot within the target by analyzing data of the target.

3. The information extraction method of claim 1, wherein identifying the set of at least one dot comprises:
capturing an image of the target; and
detecting the set of at least one dot in the captured image.

4. The information extraction method of claim 3, further comprising emitting a predetermined type of light, which makes a substance, output to the target, perceptible, to the target.

5. The information extraction method of claim 1, wherein:
performing correction on the projection and rotation distortion comprises performing Hough transform on at least one central coordinate of the at least one dot; and
horizontal lines and vertical lines passing through the at least one dot are horizontal lines and vertical lines passing through the at least one central coordinate to which the Hough transform has been applied.

6. The information extraction method of claim 1, wherein generating the set of horizontal lines and the set of vertical lines comprises:
detecting at least one rectilinear line passing through the at least one dot;
detecting two angle ranges in which the rectilinear lines are maximally present; and
including the rectilinear lines, which correspond to one of the two angle ranges, in the set of horizontal lines or the set of vertical lines.

7. The information extraction method of claim 1, further comprising performing correction on size distortion of the set of at least one dot;
wherein performing the correction on the size distortion comprises:
generating a cumulative value in a horizontal and a cumulative value in a vertical direction by accumulating values of the central coordinates of the at least one dot in the horizontal direction and the vertical direction;
detecting a horizontal period and a vertical period, in which the at least one dot appears, by analyzing the cumulative value in the horizontal direction and the cumulative value in the vertical direction; and
correcting an image of the set of at least one dot so that the horizontal period and the vertical period match an original period.

8. The information extraction method of claim 7, wherein the horizontal period and the vertical period are detected by frequency domain analysis of the cumulative value in the horizontal direction and the cumulative value in the vertical direction.

9. The information extraction method of claim 1, wherein extracting the information comprises:
for each dot of the set of at least one dot, determining a dot pattern that corresponds to the each dot among a plurality of different dot patterns; and
using a value of a bit string of the determined dot pattern as at least part of the information.

10. An information extraction apparatus, comprising:
a hardware processor configured to identify a set of at least one dot output to a target,
to extract information from the set of at least one dot, and
to perform correction on size distortion of the set of at least one dot by:
generating a cumulative value in a horizontal and a cumulative value in a vertical direction by accumulating values of the central coordinates of the at least one dot in the horizontal direction and the vertical direction;

detecting a horizontal period and a vertical period, in which the at least one dot appears, by analyzing the cumulative value in the horizontal direction and the cumulative value in the vertical direction; and correcting an image of the set of at least one dot so that the horizontal period and the vertical period match an original period.

* * * * *